US009534814B2

(12) United States Patent
Morimoto et al.

(10) Patent No.: US 9,534,814 B2
(45) Date of Patent: Jan. 3, 2017

(54) MAGNETO-CALORIC EFFECT TYPE HEAT PUMP APPARATUS

(75) Inventors: Tsuyoshi Morimoto, Obu (JP); Naoki Watanabe, Kariya (JP); Shinichi Yatsuzuka, Nagoya (JP); Kazutoshi Nishizawa, Toyoake (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 380 days.

(21) Appl. No.: 13/450,622

(22) Filed: Apr. 19, 2012

(65) Prior Publication Data
US 2012/0266607 A1    Oct. 25, 2012

(30) Foreign Application Priority Data

Apr. 25, 2011  (JP) .................................. 2011-097114

(51) Int. Cl.
 *F25B 21/00*  (2006.01)
 *B60H 1/00*  (2006.01)
 *B60H 1/32*  (2006.01)

(52) U.S. Cl.
 CPC ........... *F25B 21/00* (2013.01); *B60H 1/00899* (2013.01); *B60H 1/32* (2013.01); *F25B 2321/0022* (2013.01); *Y02B 30/66* (2013.01)

(58) Field of Classification Search
 CPC ..... F25B 21/00; F25B 2321/002; F25B 13/00; F25B 47/022; F25B 41/04; Y02B 30/66; B60H 1/00899; B60H 1/32; F28F 27/02; F01M 5/007
 USPC ............................................ 62/3.1, 467, 3.3
 See application file for complete search history.

(56) References Cited

U.S. PATENT DOCUMENTS

| | | | | | |
|---|---|---|---|---|---|
| 1,413,205 | A | * | 4/1922 | Tutt ......................... | F04B 7/045 417/488 |
| 2,589,775 | A | * | 3/1952 | Chilowsky .............. | F25B 21/00 310/306 |
| 2,820,348 | A | * | 1/1958 | Sauter ............................ | 60/659 |
| 2,937,011 | A | * | 5/1960 | Brahm .......................... | 165/203 |

(Continued)

FOREIGN PATENT DOCUMENTS

| | | | | |
|---|---|---|---|---|
| CH | WO 2004059221 A1 | * | 7/2004 | ............. F25B 21/00 |
| EP | 2 108 904 | | 10/2009 | |

(Continued)

OTHER PUBLICATIONS

International Journal of Refrigeration 29 (2006) pp. 1327-1331 (T. Okumara et al.).*

(Continued)

*Primary Examiner* — Len Tran
*Assistant Examiner* — Gordon Jones
(74) *Attorney, Agent, or Firm* — Harness, Dickey & Pierce, P.L.C.

(57) ABSTRACT

A magneto-caloric effect type heat pump apparatus includes a magneto-caloric element which generates heat when an external magnetic field is applied to and which absorbs heat when the external magnetic field is removed from; a magnetic field switcher which switches the applying and the removal of the external magnetic field from each other; a pump pumping a heat transport medium between a low-temperature end and a high-temperature end of the magneto-caloric element; and an auxiliary heat source device which supplies heat of a heating element to the magneto-caloric element.

29 Claims, 8 Drawing Sheets

(56) References Cited

U.S. PATENT DOCUMENTS

| | | | |
|---|---|---|---|
| 3,121,265 | A | 2/1964 | Hoh |
| 3,238,396 | A | 3/1966 | Schubring et al. |
| 3,668,884 | A * | 6/1972 | Nebgen .................. 62/228.5 |
| 3,743,866 | A | 7/1973 | Pirc |
| 4,447,736 | A | 5/1984 | Katayama |
| 5,656,922 | A * | 8/1997 | LaVelle et al. ............... 322/46 |
| 6,588,216 | B1 * | 7/2003 | Ghoshal ........................ 62/3.1 |
| 6,662,864 | B2 * | 12/2003 | Burk et al. ..................... 165/202 |
| 7,603,865 | B2 * | 10/2009 | Shin et al. ....................... 62/3.1 |
| 8,418,476 | B2 * | 4/2013 | Heitzler et al. .................. 62/3.1 |
| 8,596,077 | B2 * | 12/2013 | Muller et al. .................... 62/3.1 |
| 2006/0053814 | A1 * | 3/2006 | Naik et al. ...................... 62/241 |
| 2006/0218936 | A1 * | 10/2006 | Kobayashi et al. ............. 62/3.1 |
| 2008/0078184 | A1 | 4/2008 | Saito et al. |
| 2008/0236172 | A1 | 10/2008 | Muller et al. |
| 2009/0020620 | A1 * | 1/2009 | Douarre ................... 237/12.3 R |
| 2009/0070001 | A1 * | 3/2009 | Takakura et al. ............. 701/102 |
| 2009/0183513 | A1 * | 7/2009 | Luo ................................. 62/3.1 |
| 2009/0217675 | A1 | 9/2009 | Kobayashi et al. |
| 2009/0308080 | A1 * | 12/2009 | Han et al. ........................ 62/3.1 |
| 2009/0320499 | A1 * | 12/2009 | Muller et al. .................... 62/3.1 |
| 2010/0236258 | A1 * | 9/2010 | Heitzler et al. .................. 62/3.1 |
| 2011/0104530 | A1 | 5/2011 | Muller et al. |
| 2011/0215088 | A1 | 9/2011 | Muller et al. |
| 2012/0031107 | A1 | 2/2012 | Heitzler et al. |
| 2012/0032105 | A1 | 2/2012 | Seeler et al. |
| 2012/0060512 | A1 * | 3/2012 | Vetrovec ......................... 62/3.1 |
| 2012/0060513 | A1 * | 3/2012 | Vetrovec ......................... 62/3.1 |
| 2013/0319012 | A1 * | 12/2013 | Kuo et al. ........................ 62/3.1 |

FOREIGN PATENT DOCUMENTS

| | | |
|---|---|---|
| FR | 2933539 | 1/2010 |
| FR | 2936363 | 3/2010 |
| JP | A-2002-281774 | 9/2002 |
| JP | 2006-056274 | 3/2006 |
| JP | B2-4234235 | 3/2009 |
| JP | 2009-281685 | 12/2009 |
| JP | 2010-112606 | 5/2010 |
| JP | 2010112606 A * | 5/2010 |
| JP | 2010-196914 | 9/2010 |
| WO | WO 2010/004131 | 1/2010 |
| WO | WO 2010/061064 | 6/2010 |
| WO | WO2010-115791 | 10/2010 |
| WO | WO2012-102016 | 8/2012 |

OTHER PUBLICATIONS http://www.i-car.com/pdf/advantage/online/2006/053006.pdf.*
http://web.archive.org/web/20090816073905/http://www.autoshop101.com/forms/Hybrid06.pdf.*
https://techinfo.toyota.com/techInfoPortal/staticcontent/en/techinfo/html/prelogin/docs/2ndprius.pdf.*
WO 2004/059221 A1 machine translation.*
Office Action issued Feb. 6, 2014 in corresponding U.S. Appl. No. 13/450,649.
Search Report mailed Dec. 10, 2015 in the corresponding French Application No. 1201182 with English.
U.S. Appl. No. 13/450,649, filed Apr. 19, 2012, Morimoto et al.

* cited by examiner

MAGNETO-CALORIC EFFECT TYPE HEAT PUMP APPARATUS

CROSS REFERENCE TO RELATED APPLICATION

This application is based on Japanese Patent Application No. 2011-97114 filed on Apr. 25, 2011, the disclosure of which is incorporated herein by reference in its entirety.

TECHNICAL FIELD

The present disclosure relates to a magneto-caloric effect type heat pump apparatus.

BACKGROUND

FR 2933539 describes a magneto-caloric effect type heat pump apparatus associated with a housing of a battery for a vehicle, and has the corresponding publications WO 2010/004131 and US 2011/0104530. FR 2936363 describes a structure of a magneto-caloric effect type heat pump apparatus, and has the corresponding publications WO 2010/061064 and US 2011/0215088.

However, it is difficult to draw up the heat of the battery by the magneto-caloric effect type heat pump device, due to the configurations in FR 2933539 and FR 2936363.

Further, the heat of the battery cannot be used for the magneto-caloric effect type heat pump device, due to the configurations in FR 2933539 and FR 2936363.

SUMMARY

It is an object of the present disclosure to provide a magneto-caloric effect type heat pump apparatus which can use a heat of a heating element.

Further, the magneto-caloric effect type heat pump apparatus may use the heat of the heating element as an auxiliary heat source in addition to a main heat source.

Further, the magneto-caloric effect type heat pump apparatus may efficiently use the heat of the heating element.

Further, the magneto-caloric effect type heat pump apparatus may use the heat of the heating element so as to assist the startup from a low-temperature state.

According to an example of the present disclosure, a magneto-caloric effect type heat pump apparatus which supplies heat of a main heat source to a thermal load includes a magneto-caloric element, a magnetic field switcher, a pump and an auxiliary heat source device. The magneto-caloric element generates heat when an external magnetic field is applied to and absorbs heat when the external magnetic field is removed from. The magnetic field switcher switches the applying and the removal of the external magnetic field from each other. The pump pumps a heat transport medium to flow from a low-temperature end of the magneto-caloric element toward a high-temperature end of the magneto-caloric element when the external magnetic field is applied to the magneto-caloric element. The pump pumps a heat transport medium to flow from the high-temperature end toward the low-temperature end when the external magnetic field is removed from the magneto-caloric element. The auxiliary heat source device supplies heat of a heating element to the magneto-caloric element.

Accordingly, the heat of the heating element can be used in the magneto-caloric effect type heat pump apparatus.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
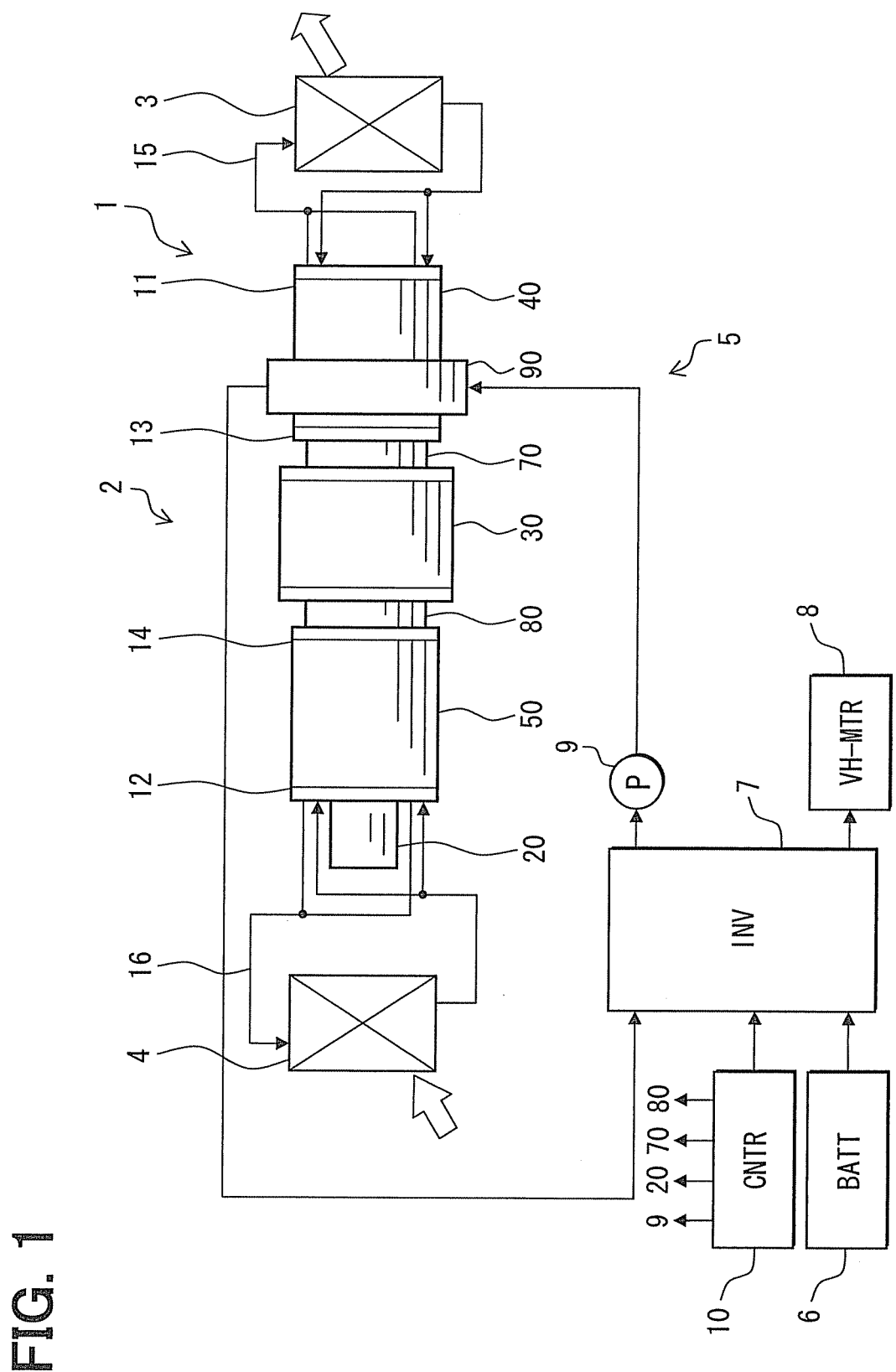
FIG. 1 is a schematic view illustrating an air-conditioner including a magneto-caloric effect heat pump apparatus according to a first embodiment.

Embodiments of the present invention will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

(First Embodiment)

As shown in FIG. 1, a magneto-caloric effect type heat pump apparatus 2 according to a first embodiment is applied to an air-conditioner 1 of a vehicle. The air-conditioner 1 conditions a temperature of air in a passenger compartment of the vehicle. The air-conditioner 1 has an indoor heat exchanger 3 arranged in the vehicle, and heat is exchanged in the indoor heat exchanger 3 with inside air. The indoor heat exchanger 3 may correspond to a high-temperature heat exchanger. The air-conditioner 1 further has an outdoor heat exchanger 4 arranged outside of the vehicle, and heat is exchanged in the outdoor heat exchanger 4 with outside air. The outdoor heat exchanger 4 may correspond to a low-temperature heat exchanger.

The air-conditioner 1 includes the magneto-caloric effect type heat pump apparatus 2 that uses magneto-caloric effect of a magneto-caloric element. Hereinafter, the magneto-caloric effect type heat pump apparatus 2 may be referred as MHP apparatus 2. In this specification, the word of the heat pump apparatus is used in a broad sense. That is, the word of the heat pump apparatus includes both of a heat pump apparatus using cold energy and a heat pump apparatus using hot energy. The heat pump apparatus using cold energy may correspond to a refrigerating cycle apparatus. The word of the heat pump apparatus may be used as a concept that includes the refrigerating cycle apparatus. For example, the MHP apparatus 2 corresponds to a heating device that heats inside air by absorbing heat of outside air.

The MHP apparatus 2 includes a motor 20, a pump 30, a first magneto-caloric element unit 40, a second magneto-caloric element unit 50, a first shift 70, and a second shift 80. The motor 20 corresponds to a power source. The pump 30 makes a heat transport medium to flow. The first magneto-caloric element unit 40 accommodates a magneto-caloric element. The second magneto-caloric element unit 50 accommodates a magneto-caloric element. The magneto-caloric element generates heat when an external magnetic field is applied to the element, and absorbs heat when the external magnetic field is removed from the element. Hereinafter, the magneto-caloric element unit 40, 50 may be referred as MCD unit 40, 50.

The MHP apparatus 2 supplies hot energy to a high temperature end 11, and supplies cold energy to a low temperature end 12. When the MHP apparatus 2 is operated, the temperature of the magneto-caloric element of the MHP apparatus 2 becomes high at the high temperature end 11, and becomes low at the low temperature end 12. The cold energy and the hot energy supplied by the MHP apparatus 2 are transported by heat transport medium. The heat transport medium may be water, for example. Hereinafter, the heat transport medium of the MHP apparatus 2 is referred as working water.

High-temperature working water flows out of the high temperature end 11, and the hot energy is supplied to outside. After the hot energy is supplied to outside, the working water returns to the high temperature end 11. At this time, cold energy is carried into the high temperature end 11.

Low-temperature working water flows out of the low temperature end 12, and the cold energy is supplied to outside. After the cold energy is supplied to outside, the working water returns to the low temperature end 12. At this time, hot energy is carried into the low temperature end 12.

The MHP apparatus 2 is equipped with the plural MCD units 40, 50 in this embodiment. The first MCD unit 40 located on the high temperature side supplies the cold energy to a middle low temperature end 13 that is located at approximately middle between the high temperature end 11 and the low temperature end 12. The second MCD unit 50 located on the low temperature side supplies the hot energy to a middle high temperature end 14 that is located at approximately middle between the high temperature end 11 and the low temperature end 12.

The first shift 70, the second shift 80, the pump 30 and the heat transport medium existing in the shift 70, 80 and the pump 30 are thermally combined with each other, between the middle low temperature end 13 and the middle high temperature end 14. Sufficient thermal binding is provided between the middle low temperature end 13 and the middle high temperature end 14 so as to form a predetermined temperature gradient between the high temperature end 11 and the low temperature end 12.

The air-conditioner 1 has a high temperature side circulation passage 15 that connects the MHP apparatus 2 to the indoor heat exchanger 3. Working water flowing through the high temperature passage 15 transmits heat to the indoor heat exchanger 3 from the MHP apparatus 2.

The air-conditioner 1 has a low temperature side circulation passage 16 that connects the MHP apparatus 2 to the outdoor heat exchanger 4. Working water flowing through the low temperature passage 16 transmits heat from the outdoor heat exchanger 4 to the MHP apparatus 2.

The air-conditioner 1 uses outside air as a main heat source. A thermal load of the air-conditioner 1 corresponds to inside air. Thus, the air-conditioner 1 corresponds to a heating device. The MHP apparatus 2 supplies the heat of the outdoor heat exchanger 4 corresponding to the main heat source to the indoor heat exchanger 3 corresponding to the thermal load.

The air-conditioner 1 further includes an auxiliary heat source device 5. The auxiliary heat source device 5 may be a power device that drives the vehicle.

The auxiliary heat source device 5 supplies heat exhausted from the power device to the MHP apparatus 2. The power device has a battery (BATT) 6, an inverter (INV) 7 and a motor (VH-MTR) 8. The inverter 7 converts DC power supplied from the battery 6 to AC power, and supplies the AC power to the motor 8. The motor 8 drives the driving wheel of the vehicle. The inverter 7 may correspond to a heating element. The waste heat of the inverter 7 is supplied to the MHP apparatus 2. A heat transport medium is supplied to the inverter 7 for cooling a semiconductor device for switching, and the heat transport medium may be water. Hereinafter, the water cooling the inverter 7 is referred as cooling water, that is distinguished from the working water. The cooling water is circulated in a circulation circuit by a pump 9.

The air-conditioner 1 is equipped with a heat exchanger 90 that supplies heat of the cooling water to the MHP apparatus 2, when the cooling water is supplied from the auxiliary heat source device 5. The heat exchanger 90 transmits the waste heat of the inverter 7 to the first MCD unit 40. More specifically, the heat exchanger 90 transmits the waste heat of the inverter 7 to the working water and the magneto-caloric element of the first MCD unit 40.

Figure 2:
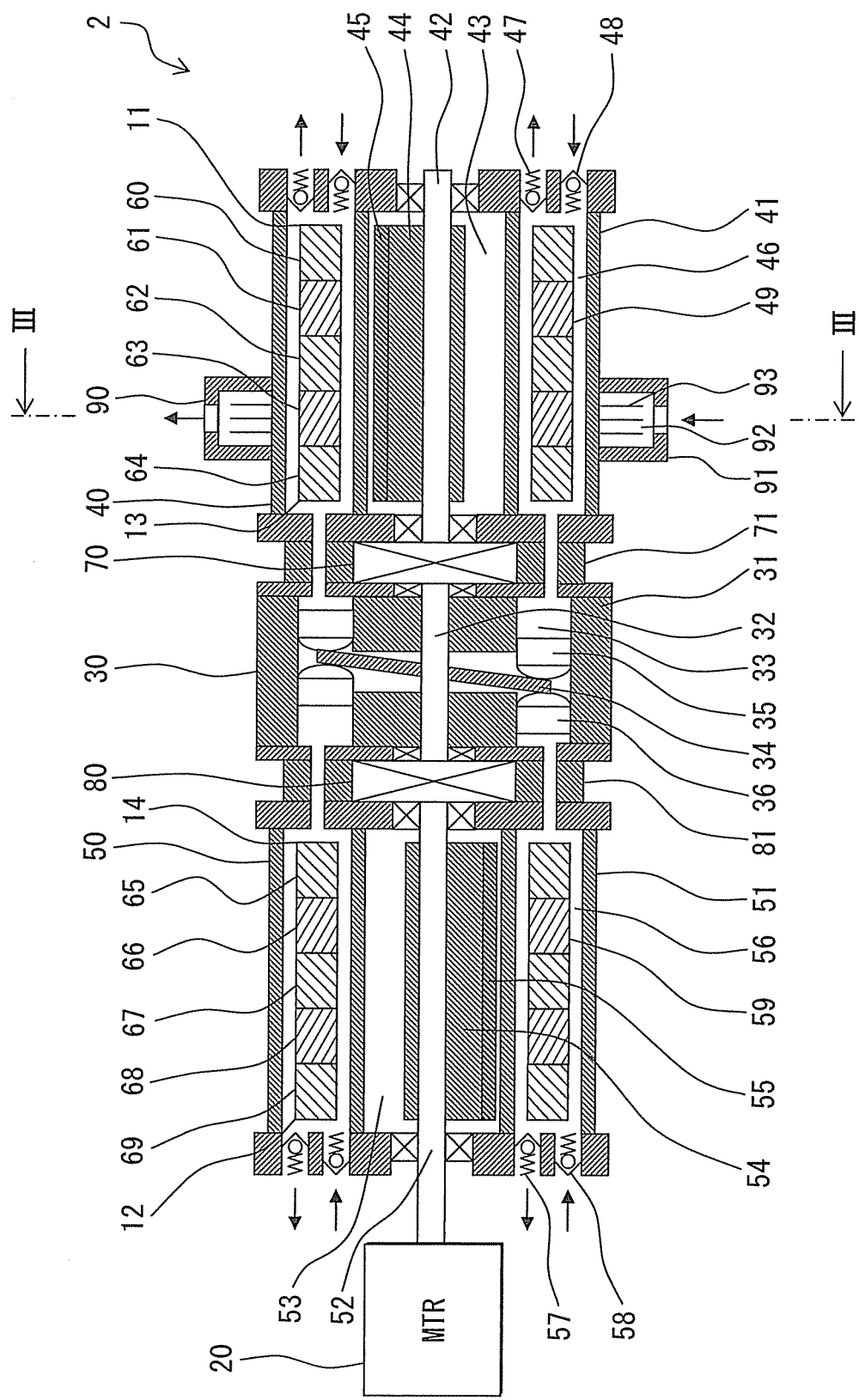
FIG. 2 is a sectional view illustrating the magneto-caloric effect heat pump apparatus of the first embodiment.
Figure 3:
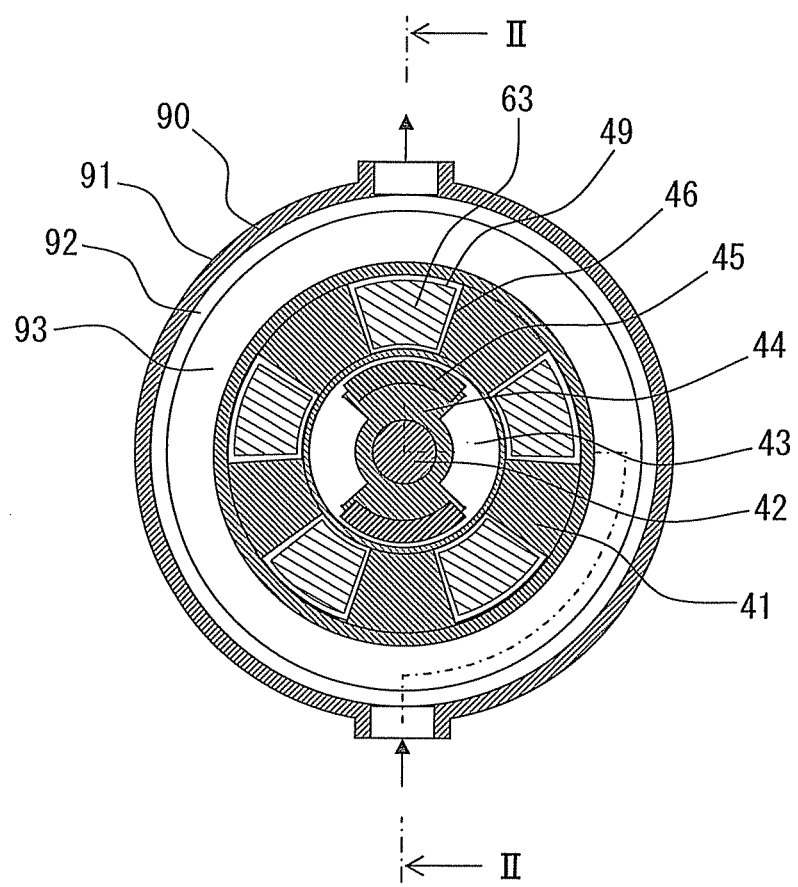
FIG. 3 is a sectional view taken along a line of FIG. 2.

FIG. 2 is a schematic sectional view of the MHP apparatus 2 of the first embodiment, which is taken along a line II-II of FIG. 3. FIG. 3 is a schematic sectional view of the MHP apparatus 2 of the first embodiment, which is taken along a line of FIG. 2.

The motor (MTR) 20 is provided as the power source of the MHP apparatus 2, and is driven by an in-vehicle battery. The motor 20 drives the pump 30. Thereby, the motor 20 and the pump 30 generate a flow of the working water. Moreover, the motor 20 rotates a permanent magnet of the MCD unit 40, 50. Thereby, the motor 20 and the MCD unit 40, 50 alternately switch a state of external magnetic field. That is, the external magnetic field is applied to the magneto-caloric element or is removed from the magneto-caloric element, and the switching is alternately performed by the motor 20 and the MCD unit 40, 50. The removal of the external magnetic field represents that no external magnetic field is applied to the magneto-caloric element.

The pump 30 generates two-direction flows of the working water in the MCD unit 40, 50, and the magneto-caloric element functions as an active magnetic refrigeration (AMR) cycle. Further, the pump 30 produces a circulation flow of the working water for supplying the cold energy and/or the hot energy obtained from the MCD unit 40, 50 to outside.

The circulation flow represents a flow of working water flowing out of the MCD unit 40, 50 and again returning to the MCD unit 40, 50. The circulation flow may include a high temperature external circulation flow of the working water that flows out of the high temperature end 11, passes through the high temperature side circulation passage 15, and returns to the high temperature end 11 again. The circulation flow may include a low temperature external circulation flow of the working water that flows out of the low temperature end 12, passes through the low temperature side circulation passage 16, and returns to the low temperature end 12 again. In this embodiment, the pump 30 generates both of the low temperature external circulation flow and the high temperature external circulation flow.

The pump 30 is a positive-displacement two-direction pump, and a cam (swash) plate type piston pump. As shown in FIG. 2, the pump 30 has a cylindrical housing 31. The housing 31 supports a revolving shaft 32 rotatably at the center axis. The housing 31 partitions and defines at least one cylinder 33. For example, plural cylinders 33 are arranged around the revolving shaft 32 at equal intervals in a circumference direction. In this embodiment, the housing 31 partitions and defines, for example, five cylinders 33.

The housing 31 accommodates a cam (swash) plate 34. The cam plate 34 is rotatably supported in the inclined state, that is, a predetermined angle is defined between the cam plate 34 and the center axis of the housing 31. The cam plate 34 is connected with the revolving shaft 32 and rotates with the revolving shaft 32.

Two pistons 35 and 36 are arranged in the respective cylinder 33. The cam plate 34 is located between the two pistons 35 and 36. One of the pistons 35 reciprocates in the right half of the cylinder 33, in FIG. 2. The other piston 36 reciprocates in the left half of the cylinder 33, in FIG. 2.

As a result, two-cylinder positive-displacement piston pump is defined in the respective cylinder 33. Volumes of the two-cylinder are complementarily fluctuated. The two-cylinder simultaneously generates a flow flowing from the low temperature end 12 to the middle high temperature end 14 and a flow flowing from the middle low temperature end 13 to the high temperature end 11. Moreover, the two-cylinder simultaneously generates a flow flowing to the middle low temperature end 13 from the high temperature end 11 and a flow flowing to the low temperature end 12 from the middle high temperature end 14.

Because the housing 31 defines the five cylinders 33, the pump 30 is a ten-cylinder piston pump. At another viewpoint, the two pistons 35, 36 oppose to each other through the cam plate 34, so that the pump 30 provides a first pump group located on the right side and a second pump group located on the left side, in FIG. 2. The first pump group is used for the first MCD unit 40. The second pump group is used for the second MCD unit 50.

The first MCD unit 40 and the second MCD unit 50 are located opposite from each other through the pump 30, and are symmetrically constructed and arranged relative to the pump 30. The first MCD unit 40 and the second MCD unit 50 construct one magneto-caloric device, as a whole, which supplies hot energy to the high temperature end 11, and supplies cold energy to the low temperature end 12.

The MCD unit 40, 50 has a cylindrical housing 41, 51. The housing 41, 51 supports a revolving shaft 42, 52 rotatably at the center axis. The housing 41, 51 partitions and defines a cylindrical magnet chamber 43, 53 around the revolving shaft 42, 52, as shown in FIG. 3. A rotor core 44, 54 is fixed to the revolving shaft 42, 52, and is constructed to define two areas in the circumference direction. A flux of magnetic induction easily passes in one of the areas, and is difficult to pass in the other area.

The cross-section of the rotor core 44, 54 has at least one sector (fan) shaped portion. In this embodiment, the rotor core 44, 54 has two sector shaped portions. A permanent magnet 45, 55 is fixed to the rotor core 44, 54. The permanent magnet 45, 55 has a cylindrical surface, and the cross-section of the magnet 45, 55 has a sector (fan) shape, as shown in FIG. 3. The permanent magnet 45, 55 is fixed to the outer cylindrical surface of the sector-shaped portion of the rotor core 44, 54.

The rotor core 44, 54 and the permanent magnet 45, 55 define two areas in the circumference direction. The external magnetic field provided by the permanent magnet 45, 55 is strong in one of the areas, and the external magnetic field provided by the permanent magnet 45, 55 is weak in the other area. Almost all of the external magnetic field is removed in the other area.

The rotor core 44, 54 and the permanent magnet 45, 55 rotate synchronizing with the rotation of the revolving shaft 42, 52, so that the area where the external magnetic field is strong and the area where the external magnetic field is weak rotate synchronizing with the rotation of the revolving shaft 42, 52. As a result, at one point around the rotor core 44, 54 and the permanent magnet 45, 55, a time period during which the external magnetic field is impressed strongly and a time period during which the external magnetic field becomes weak are repeatedly generated.

That is, the rotor core 44, 54 and the permanent magnet 45, 55 alternately repeat the impression and the removal of the external magnetic field, and correspond to a magnetic field switcher which alternately switches the impression and the removal of the external magnetic field relative to the magneto-caloric element 49, 59.

The magnetic field switcher is equipped with the first permanent magnet 45 and the second permanent magnet 55. The first permanent magnet 45 is disposed in the first MCD unit 40, and switches the impression and the removal of the magnetic field relative to the first magneto-caloric element 49 by the rotation. The second permanent magnet 55 is arranged in the second MCD unit 50, and switches the impression and the removal of the magnetic field relative to the second magneto-caloric element 59 by the rotation.

The housing 41, 51 partitions and defines at least one work chamber 46, 56. The work chamber 46, 56 is located adjacent to the magnet chamber 43, 53. For example, a plurality of the work chambers 46, 56 are arranged at equal intervals in the circumference direction, and are located on the outer side of the magnet chamber 43, 53 in the radial direction. In this embodiment, the housing 41 partitions and defines, for example, five work chambers 46, and the housing 51 partitions and defines, for example, five work chambers 56.

The respective work chamber 46, 56 defines a pillar-shaped space. A longitudinal direction of the space corresponds to the axis direction of the housing 41, 51. The respective work chamber 46, 56 is defined to correspond to only one cylinder 33. The work chamber 46 and the work chamber 56 are arranged to oppose with each other through the one cylinder 33 in the axis direction.

A first end of the respective work chamber 46 has a first gateway section through which the working water flows inward or outward. As shown in FIG. 2, the first gateway section has an exit 47 through which the working water is supplied to the indoor heat exchanger 3, and an inlet 48 which receives the working water returning from the indoor heat exchanger 3. A check valve is disposed in the exit 47, and permits only the outward flow of the working water from the work chamber 46. A check valve is disposed in the inlet 48, and permits only the inward flow of the working water into the work chamber 46. The check valve disposed in the exit 47 and the check valve disposed in the inlet 48 may be made of a lead valve or a ball valve.

A second end of the respective work chamber 46 has a second gateway section which communicates with the pump 30. The second gateway section communicates with only one pump chamber defined by the one cylinder 33 and the one piston 35.

A first end of the respective work chamber 56 has a first gateway section through which the working water flows inward or outward. The first gateway section has an exit 57 through which the working water is supplied to the outdoor heat exchanger 4, and an inlet 58 which receives the working water returning from the outdoor heat exchanger 4. A check valve is disposed in the exit 57, and permits only the outward flow of the working water from the work chamber 56. A check valve is disposed in the inlet 58, and permits only the inward flow of the working water into the work chamber 56. The check valve disposed in the exit 57 and the check valve disposed in the inlet 58 may be made of a lead valve or a ball valve.

A second end of the respective work chamber 56 has a second gateway section which communicates with the pump 30. The second gateway section communicates with only one pump chamber defined by the one cylinder 33 and the one piston 36.

The work chamber 46, 56 corresponds to a passage through which the working water passes as a refrigerant. Working water flows along the longitudinal direction of the work chamber 46, 56 in both directions.

Furthermore, the work chamber 46, 56 provides an accommodation chamber accommodating the magneto-caloric element 49, 59. The housing 41, 51 provides a container defining the work chamber 46, 56. The magneto-caloric element 49, 59 is arranged in the work chamber 46, 56 as a magnetic working substance which has magneto-caloric effect.

When the external magnetic field is applied to the magneto-caloric element 49, 59, electron spins gather in the direction of the magnetic field. At this time, magnetic entropy decreases and the temperature is raised by emitting heat.

When the external magnetic field is removed from the magneto-caloric element 49, 59, the electron spins become to have disordered state. At this time, magnetic entropy increases and the temperature is lowered by absorbing heat.

The magneto-caloric element 49, 59 is made of magnetic substance which has a high magneto-caloric effect in an ordinary temperature region. For example, the magneto-caloric element 49, 59 may be made of a gadolinium(Gd)-base material or lanthanum-iron-silicon compound. Alternatively, a mixture of manganese, iron, phosphorus, and germanium may be used.

The magneto-caloric element 49, 59 has a bar (stick) shape extending in the axis direction of the MCD unit 40, 50. The magneto-caloric element 49, 59 is shaped to sufficiently be able to exchange heat with the working water flowing through the work chamber 46, 56. The respective magneto-caloric element 49, 59 may be referred as an element bed.

In this embodiment, a magneto-caloric element disposed between the high temperature end 11 and the low temperature end 12 is constructed by the first magneto-caloric element 49 and the second magneto-caloric element 59. The first magneto-caloric element 49 is arranged in the first MCD unit 40, and has the middle low temperature end 13 opposing to the motor 30 and the high temperature end 11 opposing to outside. The middle low temperature end 13 and the high temperature end 11 oppose with each other through the first magneto-caloric element 49. The second magneto-caloric element 59 is arranged in the second MCD unit 50, and has the low temperature end 12 opposing to outside and the middle high temperature end 14 opposing to the pump 30. The middle high temperature end 14 and the low temperature end 12 oppose with each other through the second magneto-caloric element 59.

The magneto-caloric element 49, 59 is influenced by the external magnetic field impressed or removed by the rotor core 44, 54 and the permanent magnet 45, 55. That is, when the revolving shaft 42, 52 rotates, the external magnetic field is alternately applied or removed so that the magneto-caloric element 49, 59 is alternately magnetized or non-magnetized.

As shown in FIG. 2, the respective magneto-caloric element 49 has plural element units 60, 61, 62, 63, 64 (hereinafter referred as 60-64). The plural element units 60-64 are arranged in the longitudinal direction of the magneto-caloric element 49, that is, along a flowing direction of the working water.

Materials respectively constructing the plural element units 60-64 have different Curie temperatures. That is, the plural element units 60-64 respectively have high magneto-caloric effects $\Delta S(J/kgK)$ in temperature zones different from each other.

The element unit 60 located most adjacent to the high temperature end 11 has a material composition to have a high magneto-caloric effect in a temperature range that is close to a temperature of the high temperature end 11 in an ordinary operation state. The element unit 64 located most adjacent to the middle low temperature end 13 has a material composition to have a high magneto-caloric effect in a temperature range that is close to a temperature of the middle low temperature end 13 in an ordinary operation state.

The respective magneto-caloric element 59 has plural element units 65, 66, 67, 68, 69 (hereinafter referred as 65-69). The plural element units 65-69 are arranged in the longitudinal direction of the magneto-caloric element 59, that is, along a flowing direction of the working water.

Materials respectively constructing the plural element units 65-69 have different Curie temperatures. That is, the plural element units 65-69 respectively have high magneto-caloric effects $\Delta S(J/kgK)$ in temperature zones different from each other.

The element unit 69 located most adjacent to the low temperature end 12 has a material composition to have a high magneto-caloric effect in a temperature range that is close to a temperature of the low temperature end 12 in an ordinary operation state. The element unit 65 located most adjacent to the middle high temperature end 14 has a material composition to have a high magneto-caloric effect in a temperature range that is close to a temperature of the middle high temperature end 14 in an ordinary operation state.

A temperature zone in which a high magneto-caloric effect is demonstrated is referred as efficient temperature zone. Upper limit temperature and lower limit temperature of the efficient temperature zone are dependent on, for example, the material composition of the magneto-caloric element 49. The plural element units 60-64 are arranged in series in a manner that the efficient temperature zones are aligned between the high temperature end 11 and the middle low temperature end 13.

In other words, the efficient temperature zones of the plural element units 60-64 have a step-shaped distribution so as to be gradually lowered from the high temperature end 11 to the middle low temperature end 13. The step-shaped distribution of the efficient temperature zones approximately correspond to a temperature distribution defined between the high temperature end 11 and the middle low temperature end 13 in an ordinary operation state.

The plural element units 65-69 are arranged in series in a manner that the efficient temperature zones are aligned between the middle high temperature end 14 and the low temperature end 12. In other words, the efficient temperature zones of the plural element units 65-69 have a step-shaped distribution so as to be gradually lowered from the middle high temperature end 14 to the low temperature end 12. The step-shaped distribution of the efficient temperature zones approximately correspond to a temperature distribution defined between the middle high temperature end 14 and the low temperature end 12 in an ordinary operation state.

Furthermore, the first and second magneto-caloric elements 49, 59 of the first and second MCD units 40, 50 construct one magneto-caloric element by a thermally series connection. Specifically, the plural element units 60-64, 65-69 are arranged in series in a manner that the efficient temperature zones are aligned between the high temperature end 11 and the low temperature end 12. In other words, the efficient temperature zones of the plural element units 60-64, 65-69 have a step-shaped distribution between the high temperature end 11 and the low temperature end 12. The step-shaped distribution of the efficient temperature zones approximately correspond to a temperature distribution defined between the high temperature end 11 and the low temperature end 12 in an ordinary operation state.

Moreover, the respective MCD unit 40, 50 has the plural magneto-caloric elements 49, 59 which are thermally connected in parallel. For example, in the first MCD unit 40, the five magneto-caloric elements 49 are thermally connected in parallel. Further, the five magneto-caloric elements 59 are thermally connected in parallel, in the second MCD unit 50.

The first shift 70 is disposed between the revolving shaft 32 of the pump 30 and the revolving shaft 42 of the first MCD unit 40. The first shift 70 controls a rotation speed and/or a rotation phase between the revolving shaft 32 and the revolving shaft 42.

The second shift 80 is disposed between the revolving shaft 32 of the pump 30 and the revolving shaft 52 of the second MCD unit 50. The second shift 80 controls a rotation speed and/or a rotation phase between the revolving shaft 32 and the revolving shaft 52.

The motor 20 is connected to the revolving shaft 52 of the second MCD unit 50, for example. The first shift 70 and the second shift 80 control the rotation relationship among the revolving shaft 32 of the pump 30, the revolving shaft 42 of the first MCD unit 40, and the revolving shaft 52 of the second MCD unit 50, so as to realize the AMR cycle.

A passage portion 71 is arranged between the pump 30 and the first MCD unit 40, and defines a passage for the working water. The one cylinder 33 and the one work chamber 46 communicate with each other through the passage defined by the passage portion 71.

A passage portion 81 is arranged between the pump 30 and the second MCD unit 50, and defines a passage for the working water. The one cylinder 33 and the one work chamber 56 communicate with each other through the passage defined by the passage portion 81.

A plurality of MHP units is constructed by the first MCD unit 40 and the multi-cylinder piston pump defined in the right half of the pump 30. Specifically, five MHP units are constructed. The plurality of MHP units is thermally connected in parallel.

A plurality of MHP units is constructed by the second MCD unit 50 and the multi-cylinder piston pump defined in the left half of the pump 30. Specifically, five MHP units are constructed. The plurality of MHP units is thermally connected in parallel.

Further, the plurality of MHP units located on the right side of the pump 30 and the plurality of MHP units located on the left side of the pump 30 are thermally connected in series.

As shown in FIG. 2, the heat exchanger 90 of the auxiliary heat source device 5 is arranged outside of the housing 41. The heat exchanger 90 has a housing 91 located outside of the housing 41. The housing 91 has a ring shape surrounding the outer circumference of the housing 41. The housing 91 partitions and defines a jacket 92 on the outer side of the housing 41 in the radial direction. The jacket 92 is used for flowing the cooling water. The housing 91 has an inlet and an exit for the cooling water. The cooling water for cooling the inverter 7 is circulated by the pump 9 and flows through the jacket 92.

The heat exchanger 90 further has plural fins 93 for facilitating the heat exchange between the cooling water and the housing 41. Due to the fins 93, the waste heat of the inverter 7 is easily transmitted to the housing 41. The heat transmitted to the housing 41 is further transmitted to the working water and the magneto-caloric element 49.

That is, the auxiliary heat source device 5 supplies the heat of the inverter 7 to the magneto-caloric element 49 through the working water. According to this construction, the heat of the inverter 7 is transmitted to the magneto-caloric element 49 using the working water. Moreover, due to the heat exchanger 90 which transmits the heat of the inverter 7 to the working water, the heat transmission can be performed with high efficiency.

The heat exchanger 90 is located to supply the heat to the MHP apparatus 2. Thereby, the MHP apparatus 2 can be heated by the waste heat of the inverter 7. The MHP apparatus 2 transports the heat to the high temperature end 11. Therefore, the waste heat of the inverter 7 is transported to the high temperature end 11 in addition to the heat absorbed through the outdoor heat exchanger 4. As a result, the heating effect of the indoor heat exchanger 3 can be increased. Moreover, at the standup time of the MHP apparatus 2, the heating can be quickly started by the waste heat of the inverter 7. In a low temperature environment such as winter, the MHP apparatus 2 can be warmed by the waste heat of the inverter 7.

The heat exchanger 90 is located adjacent to the high temperature end 11 rather than a thermally middle or intermediate part of the MHP apparatus 2. Therefore, the heating can be performed suitably for the MHP apparatus 2 that is used as the heating device. In other words, the auxiliary heat source device 5 supplies the heat of the inverter 7 to the magneto-caloric element 49 from an intermediate position between the high temperature end 11 and the low temperature end 12, or an intermediate position between the high temperature end 11 and the middle low temperature end 13. Thus, the intermediate part of the magneto-caloric element 49 can be heated. Thereby, the heat of the inverter 7 can be efficiently pumped up to the high temperature end 11. Moreover, when the heat of the inverter 7 is supplied at the startup time of the MHP apparatus 2, the startup can be assisted by heating the magneto-caloric element 49 from the intermediate part.

In other words, the auxiliary heat source device 5 supplies the heat of the inverter 7 to the magneto-caloric element 49 from a position adjacent to the high temperature end 11 rather than the middle end (center section) 13, 14 between the low temperature end 12 and the high temperature end 11. Thus, the heat of the inverter 7 can be efficiently pumped up to the high temperature end 11. Moreover, because the temperature of the high temperature end 11 is raised, the start up of the MHP apparatus 2 can be assisted.

The heat exchanger 90 is arranged in a manner that the heat is supplied only to the first MCD unit 40. Thereby, the waste heat of the inverter 7 can be supplied to the MCD unit 40 on the high temperature side, not to the MCD unit 50 on the low temperature side. Thus, the waste heat is easily transmitted to the high temperature end 11.

As shown in FIG. 2, the heat exchanger 90 is arranged in a manner that the heat is supplied to the element unit 63 having an efficient temperature zone corresponding to the temperature of the cooling water at the ordinary operation time. When the inverter 7 is operated, the temperature of the cooling water has an approximately constant (uniform) value. The heat of the cooling water is transmitted to the housing 41 from the heat exchanger 90. Then, the heat of the cooling water is transmitted to the working water from the housing 41, and is further transmitted to the element unit 63 from the working water. The element unit 63 has the high magneto-caloric effect in the efficient temperature zone. Therefore, the waste heat of the inverter 7 can be absorbed efficiently by the element unit 63, and the efficiently absorbed heat can be transmitted to the high temperature end 11.

Accordingly, the heat of the inverter 7 is supplied to the element unit 63 having the efficient temperature zone corresponding to the temperature of the heat supplied from the inverter 7. Therefore, the element unit 63 can efficiently pump up the heat of the inverter 7.

The air-conditioner 1 has a control device (CNTR) 10. The control device 10 controls plural components of the air-conditioner 1. For example, the control device 10 controls the motor 20 to at least start or stop the MHP apparatus 2. Moreover, the control device 10 controls the first shift 70 and the second shift 80 to switch the state of the rotation speed and/or the rotation phase of the first shift 70 and the second shift 80. Moreover, the control device 10 controls the pump 9 to at least intermittently supply the waste heat of the inverter 7 to the MHP apparatus 2. Furthermore, the control device 10 controls the inverter 7 to adjust the amount of the waste heat of the inverter 7.

The control device 10 may be a warm-up portion that executes a warming-up control, at the startup time of the MHP apparatus 2 in winter or in cold district. In the warming-up control, the MHP apparatus 2 is warmed so as to reduce a starting time necessary for starting the MHP apparatus 2. The warm-up portion activates to start the pump 9 almost simultaneously with the starting of the MHP apparatus 2 or in advance of the starting of the MHP apparatus 2, when the MHP apparatus 2 is activated in low temperature environment. Thereby, the temperature of the MHP apparatus 2, especially the temperature of the magneto-caloric element 49, 59 can be raised quickly. Furthermore, when the MHP apparatus 2 is started, the warm-up portion controls the inverter 7 to increase the heat amount of the inverter 7 compared with a usual time. Thus, the MHP apparatus 2 can be quickly heated.

Moreover, the control device 10 may correspond to an auxiliary heat amount controller that controls the amount of heat supplied to the MHP apparatus 2 from the inverter 7, by controlling the inverter 7 and/or the pump 9. For example, the auxiliary heat amount controller controls the amount of heat pumped up by the MHP apparatus 2 from outside air by controlling the heat amount of the inverter 7.

The control device 10 may be constructed by a microcomputer having a media that is readable by a computer. The media stores a program readable by a computer. The media may be a memory. The control device 10 works and functions to practice the above-described controls when the program is executed by the control device 10. The control device 10 may include a functional block or module.

Operation of the air-conditioner 1 will be described. When the motor 20 is rotated, the revolving shaft 52 is rotated. The rotor core 54 and the permanent magnet 55 are rotated by the rotation of the revolving shaft 52. Thereby, the external magnetic field is alternately applied to or removed from the plural magneto-caloric elements 59 by the permanent magnet 55.

The rotation of the revolving shaft 52 is transmitted to the revolving shaft 32 through the second shift 80. When the revolving shaft 32 is rotated, the cam plate 34 is rotated. When the cam plate 34 is rotated, a radially outside portion of the cam plate 34 moves in the axis direction, and the piston 35 and the piston 36 reciprocate in the axis direction. At this time, the volume of the cylinder 33 fluctuates. The working water flows out of the cylinder 33 or flows into the cylinder 33 in accordance with a change in the volume of the cylinder 33.

The piston 36 increases or decreases the volume of the left half of the cylinder 33. When the piston 36 reciprocates, two-direction flows of the working water are generated in the work chamber 56. When the working water flows toward the low temperature end 12 from the middle high temperature end 14, the cold energy of the magneto-caloric element 59 is transported toward the low temperature end 12 from the middle high temperature end 14. Furthermore, a part of the working water existing near the low temperature end 12 flows into the low temperature side circulation passage 16 through the exit 57. The working water of the low temperature side circulation passage 16 passes through the outdoor heat exchanger 4. At this time, the working water is heated by outside air. That is, the working water cools the outside air. When the working water flows toward the middle high temperature end 14 from the low temperature end 12, the hot energy of the magneto-caloric element 59 is transported toward the middle high temperature end 14 from the low temperature end 12. At this time, the working water flows into the work chamber 56 from the low temperature side circulation passage 16.

Furthermore, the rotation of the revolving shaft 32 is transmitted to the revolving shaft 42 through the first shift 70. When the revolving shaft 42 is rotated, the rotor core 44 and the permanent magnet 45 are rotated. Thereby, the external magnetic field is alternately applied to or removed from the plural magneto-caloric elements 49 by the permanent magnet 45.

The piston 35 increases or decreases the volume of the right half of the cylinder 33. When the piston 35 reciprocates, two-direction flows of the working water are generated in the work chamber 46. When the working water flows toward the high temperature end 11 from the middle low temperature end 13, the hot energy of the magneto-caloric element 49 is transported toward the high temperature end 11 from the middle low temperature end 13. Furthermore, a part of the working water existing near the high temperature end 11 flows into the high temperature side circulation passage 15 through the exit 47. The working water of the low temperature side circulation passage 15 passes through the indoor heat exchanger 3. At this time, the working water heats inside air. That is, the working water is cooled by the inside air. When the working water flows toward the middle low temperature end 13 from the high temperature end 11, the cold energy of the magneto-caloric element 49 is transported toward the middle low temperature end 13 from the high temperature end 11. At this time, the working water flows into the work chamber 46 from the high temperature side circulation passage 15.

The second shift 80 synchronizes the rotation of the revolving shaft 52 and the rotation of the revolving shaft 32 so as to realize the AMR cycle by a combination of the switch in the external magnetic field between the applying and the removal for the second MCD unit 50 and the switch in the two-direction flows of the working water by the pump 30.

The first shift 70 synchronizes the rotation of the revolving shaft 42 and the rotation of the revolving shaft 32 so as to realize the AMR cycle by a combination of the switch in the external magnetic field between the applying and the removal for the first MCD unit 40 and the switch in the two-direction flows of the working water by the pump 30.

In order to realize the AMR cycle, the switch in the external magnetic field between the applying and the removal and the switch in the two-direction flows of the working water are combined so as to repeat the following four processes (1), (2), (3) and (4). Due to the AMR cycle, heat is transported stepwise and gradually, so that high efficiency can be obtained in the heat transportation.

(1) Impress the external magnetic field to the magneto-caloric element 49, 59 using the magnetic field switcher 44, 45, 54, 55.

(2) Flow the working water using the pump 30 from the low temperature end 12 toward the middle high temperature end 14 and from the middle low temperature end 13 toward the high temperature end 11 in a period during which the magnetic field is impressed.

(3) Remove the external magnetic field from the magneto-caloric element 49, 59 by controlling the magnetic field switcher 44, 45, 54, 55.

(4) Flow the working water using the pump 30 from the middle high temperature end 14 toward the low temperature end 12 and from the high temperature end 11 toward the middle low temperature end 13 in a period during which the magnetic field is removed.

When the four processes (1), (2), (3) and (4) are repeated by the left half of the pump 30 and the MCD unit 50, the cold energy generated by the magneto-caloric effect is transported toward the low temperature end 12, and the hot energy generated by the magneto-caloric effect is transported toward the middle high temperature end 14. At this time, the magneto-caloric element 59 and the working water serve as a heat reservoir in which the hot energy and cold energy are stored.

When the above-mentioned processes are repeated, the inside of the work chamber 56 serves as a heat reservoir having a temperature gradient, and the temperature gradient gradually becomes large. Finally, in the ordinary operation status, a big temperature difference is generated between the low temperature end 12 and the middle high temperature end 14. The hot energy transported to the middle high temperature end 14 is further transmitted to the first MCD unit 40 via the second shift 80, the pump 30, and the first shift 70.

When the four processes (1), (2), (3) and (4) are repeated by the right half of the pump 30 and the MCD unit 40, the cold energy generated by the magneto-caloric effect is transported toward the middle low temperature end 13, and the hot energy generated by the magneto-caloric effect is transported toward the high temperature end 11. At this time, the magneto-caloric element 49 and the working water serve as a heat reservoir in which the hot energy and cold energy are stored.

When the above-mentioned processes are repeated, the inside of the work chamber 46 serves as a heat reservoir having a temperature gradient, and the temperature gradient gradually becomes large. Finally, in the ordinary operation status, a big temperature difference is generated between the middle low temperature end 13 and the high temperature end 11. The cold energy transported to the middle low temperature end 13 is further transmitted to the second MCD unit 50 via the first shift 70, the pump 30, and the second shift 80.

Thus, in this embodiment, the pump 30 pumps the working water toward the high temperature end 11 from the low temperature end 12, when the external magnetic field is impressed to the magneto-caloric element 49, 59. When the external magnetic field is removed from the magneto-caloric element 49, 59, the heat transport medium is pumped toward the low temperature end 12 from the high temperature end 11.

Furthermore, when the pump 30 pumps the working water toward the high temperature end 11 from the low temperature end 12, the working water is discharged to the high temperature side circulation passage 15 from the high temperature end 11, and the working water is drawn from the low temperature side circulation passage 16 to the low temperature end 12.

Furthermore, when the pump 30 pumps the working water toward the low temperature end 12 from the high temperature end 11, the working water is discharged to the low temperature side circulation passage 16 from the low temperature end 12, and the working water is drawn from the high temperature side circulation passage 15 to the high temperature end 11.

If an attention is paid only to the first MCD unit 40, the pump 30 discharges the working water to the high temperature side circulation passage 15 from the high temperature end 11, when the working water flows toward the high temperature end 11 from the middle low temperature end 13. Furthermore, the pump 30 draws the working water from the high temperature side circulation passage 15 to the high temperature end 11, when the working water flows toward the middle low temperature end 13 from the high temperature end 11.

If an attention is paid only to the second MCD unit 50, the pump 30 discharges the working water to the low temperature side circulation passage 16 from the low temperature end 12, when the working water flows toward the low temperature end 12 from the middle high temperature end 14. Furthermore, the pump 30 draws the working water from the low temperature side circulation passage 16 to the low temperature end 12, when the heat transport medium flows toward the middle high temperature end 14 from the low temperature end 12.

The MCD unit 40, the pump 30, and the MCD unit 50 function as a series of the MHP apparatus 2. As a result, a big temperature gradient arises between the low temperature end 12 and the high temperature end 11. The low-temperature working water flowing out of the low temperature end 12 absorbs heat from outside air in the outdoor heat exchanger 4, and supplies the heat to the low temperature end 12 by returning to the low temperature end 12 again. The MHP apparatus 2 pumps up the heat supplied to the low temperature end 12 to the high temperature end 11. The high-temperature working water flowing out of the high temperature end 11 supplies the heat to inside air in the indoor heat exchanger 3, and receives heat from the high temperature end 11 by returning to the high temperature end 11 again.

The inverter 7 converts the DC power supplied from the battery 6 into AC power, and supplies the AC power to the motor 8. A switching element of the inverter 7 is cooled by the cooling water. When the pump 9 is driven by the control device 10, the heat of the inverter 7 is supplied to the heat exchanger 90. The heat exchanger 90 warms the MHP apparatus 2 with the cooling water. Thereby, the MHP apparatus 2 can be quickly activated also in low temperature environment.

Furthermore, the heat exchanger 90 functions as a heat source which supplies heat for the MHP apparatus 2. Because the waste heat of the inverter 7 is supplied to the MHP apparatus 2, the amount of heat obtained by the high temperature end 11 of the MHP apparatus 2 increases. As a result, the heat amount of the indoor heat exchanger 3 used for a heating operation increases.

The heat exchanger 90 is arranged to supply heat to the element unit 63 that has the efficient temperature zone approximately equal to the temperature of the cooling water at the ordinary operation time. In other words, the heat exchanger 90 is arranged to supply heat to the element unit 63 which has a high magneto-caloric effect at the ordinary-time temperature of the cooling water. Therefore, the heat of the cooling water is efficiently absorbed by the MHP apparatus 2.

According to the first embodiment, the waste heat of the inverter 7 can be used for the MHP apparatus 2 by using the inverter 7 as a heating element. The MHP apparatus 2 can use outside air as a main heat sources, and further can use the heat of the inverter 7 as an auxiliary heat source.

Moreover, the heat of the inverter 7 is supplied to the MCD unit of the MHP apparatus 2 which has the efficient temperature zone corresponding to the temperature of the heat supplied from the inverter 7, so that the heat of the inverter 7 can be efficiently used. Furthermore, the MHP apparatus 2 can be preheated with the heat supplied from the inverter 7. Thereby, the heat of the heating element can be used to assist the startup of the MHP apparatus 2 from a cold condition.

(Second Embodiment)

Figure 4:
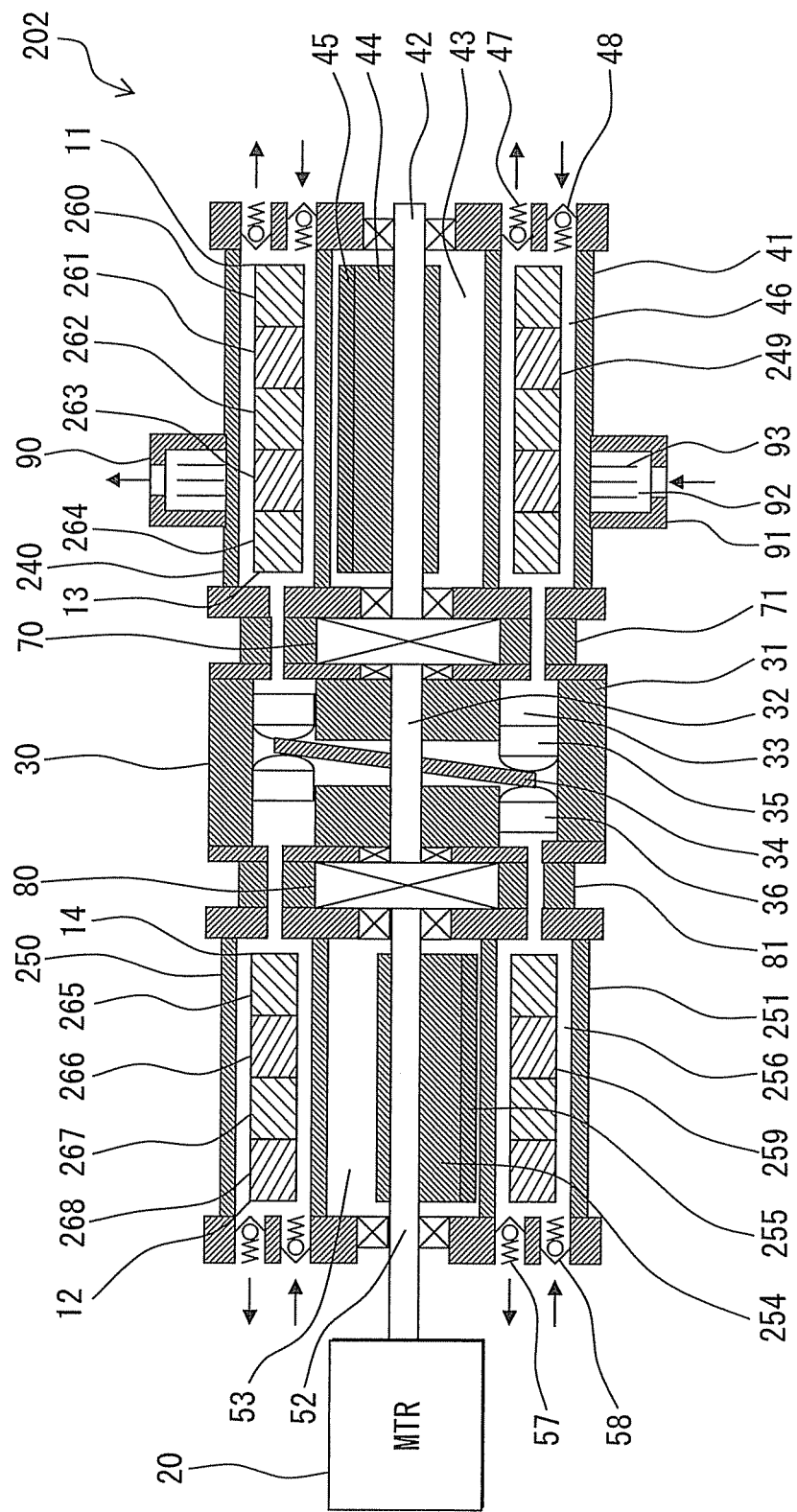
FIG. 4 is a sectional view illustrating a magneto-caloric effect heat pump apparatus according to a second embodiment.

FIG. 4 is a sectional view illustrating a MHP apparatus 202 according to a second embodiment. While the high-temperature side MCD unit 40 and the low-temperature side MCD unit 50 have approximately the same size and thermal capacity in the first embodiment, the number of the magneto-caloric elements located on the low-temperature side from the heat exchanger 90 is reduced, in the second embodiment, considering the heat amount of the waste heat of the inverter 7 supplied to the MHP apparatus through the heat exchanger 90.

In the MHP apparatus 202, size and thermal capacity of a low-temperature side MCD unit 250 are made smaller, compared with a high-temperature side MCD unit 240. The MCD unit 240 has a magneto-caloric element 249 constructed by five element units 260, 261, 262, 263, 264 (hereinafter referred as 260-264). The MCD unit 250 has a magneto-caloric element 259 constructed by four element units 265, 266, 267, 268 (hereinafter referred as 265-268). Therefore, the amount of the magneto-caloric element 259 of the low-temperature side MCD unit 250 is set smaller than the amount of the magneto-caloric element 249 of the high-temperature side MCD unit 240. Accordingly, the axial length of the housing 251, the rotor core 254 and the permanent magnet 255 is set smaller than the axial length of the housing 41, the rotor core 44 and the permanent magnet 45. That is, the magnetic circuit of the low-temperature side MCD unit 250 is set smaller than the magnetic circuit of the high-temperature side MCD unit 240. As a result, the whole size of the MHP apparatus 202 is made smaller.

Also in the second embodiment, the step-shaped distribution of the efficient temperature range of the element units 260-264, 265-268 approximately corresponds to the temperature distribution defined between the high temperature end 11 and the low temperature end 12 in the ordinary operation time.

According to the second embodiment, the amount of the magneto-caloric element used in the MHP apparatus 202 can be reduced. Further, the size of the magnetic circuit can be made smaller. As a result, the size of the MHP apparatus 202 can be made smaller.

(Third Embodiment)

Figure 5:
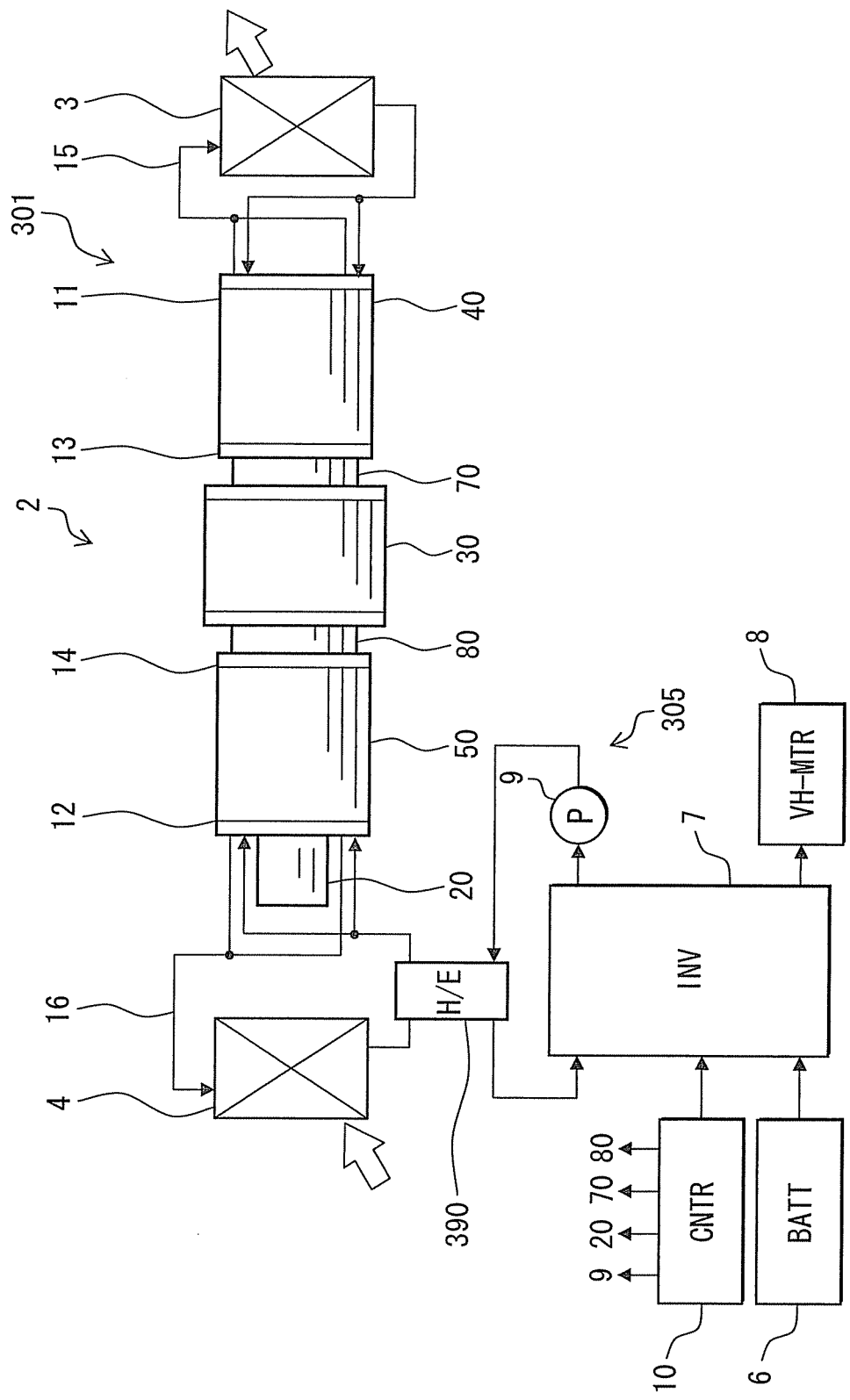
FIG. 5 is a schematic view illustrating an air-conditioner including a magneto-caloric effect heat pump apparatus according to a third embodiment.

FIG. 5 illustrates a schematic view illustrating an air-conditioner 301 having a MHP apparatus 2 according to a third embodiment. While the waste heat of the inverter 7 is recovered by the heat exchanger 90 fixed to the high-temperature side MCD unit 40, 240 in the first and second embodiments, a heat exchanger 390 of an auxiliary heat source device 305 is arranged in the low temperature side circulation passage 16 in the third embodiment.

The heat exchanger 390 is located between the outdoor heat exchanger 4 and the MCD unit 50, in the low temperature side circulation passage 16. The auxiliary heat source device 305 supplies heat of the inverter 7 to the magneto-caloric element 59, 49 through the low temperature end 12. Accordingly, the heat absorbing from outside air corresponding to the main heat source and the heat absorbing from the inverter 7 can be conducted in parallel relationship.

(Fourth Embodiment)

Figure 6:
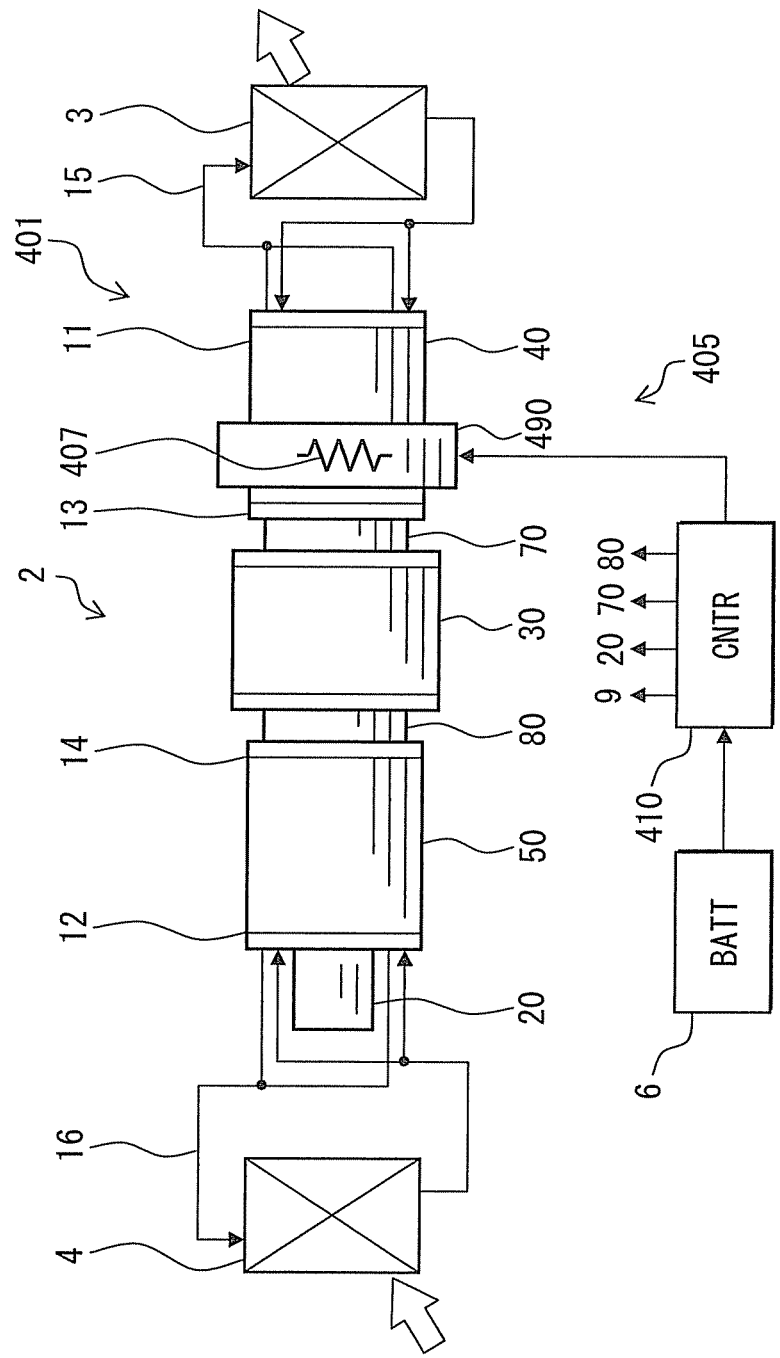
FIG. 6 is a schematic view illustrating an air-conditioner including a magneto-caloric effect heat pump apparatus according to a fourth embodiment.

FIG. 6 illustrates a schematic view illustrating an air-conditioner 401 having a MHP apparatus 2 according to a fourth embodiment. While the inverter 7 is the heating member of the auxiliary heat source device 5, 305 in the above embodiments, an electric heater 407 is the heating member of the auxiliary heat source device 405 in the fourth embodiment. The battery 6 supplies electricity to the electric heater 407. The heat exchanger 490 including the electric heater 407 is arranged to the MCD unit 40. Heat generated from the electric heater 407 is transmitted to the working water by the heat exchanger 490. The electric heater 407 emits heat when electricity is supplied from the battery 6. When the electric heater 407 emits heat, the temperature of the electric heater 407 corresponds to the efficiency temperature range of the element unit 63. The control device 410 controls the electricity supply for the electric heater 407. Accordingly, the heat of the electric heater 407 corresponding to the heating member can be supplied to the MHP apparatus 2.

(Fifth Embodiment)

Figure 7:
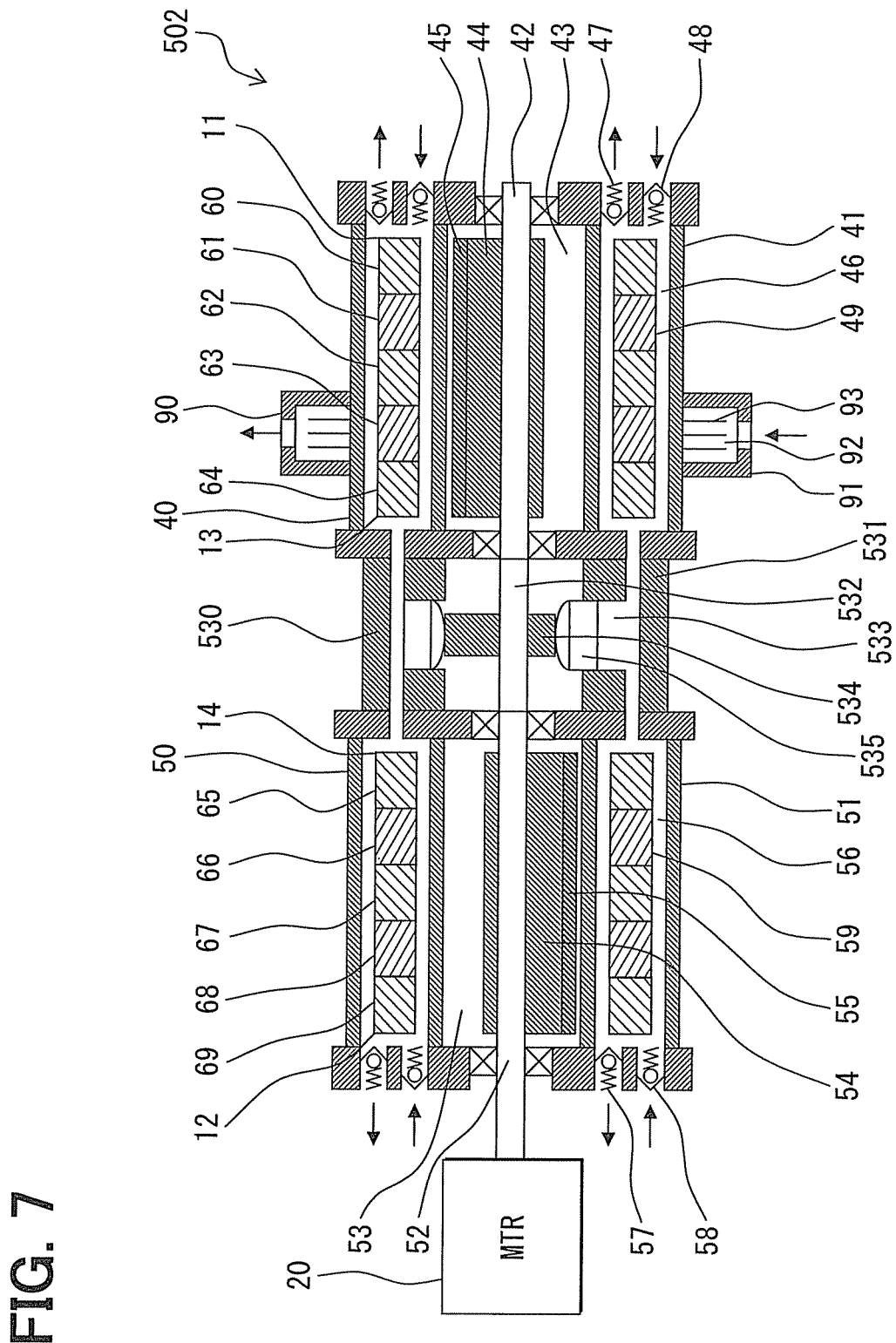
FIG. 7 is a sectional view illustrating a magneto-caloric effect heat pump apparatus according to a fifth embodiment.

FIG. 7 is a sectional view illustrating a MHP apparatus 502 according to a fifth embodiment. The MHP apparatus 502 is used in the air-conditioner 1 of the first embodiment, instead of the MHP apparatus 2. While the pump 30 is made of the swash plate pump in the above embodiments, a pump 530 of the fifth embodiment is made of a radial piston pump. Further, in the fifth embodiment, two work chambers 46, 56 are connected to correspond to one capacity-variable chamber.

The pump 530 has a cylindrical housing 531. The housing 531 supports a revolving shaft 532 rotatably at the center axis. The revolving shaft 532 is directly connected to the revolving shaft 42 and the revolving shaft 52. The housing 531 partitions and defines at least one cylinder 533. The housing 531 partitions and defines plural cylinders 533 arranged at equal intervals, around the revolving shaft 532. For example, the housing 531 partitions and defines five cylinders 533.

The housing 531 accommodates a cam 534. The cam 534 has a cam surface on the outer circumference surface. The cam 534 is coupled to the revolving shaft 532 to rotate with the revolving shaft 532. One piston 535 is arranged in the respective cylinder 533. The piston 535 reciprocates in the cylinder 533 in the radial direction. As a result, a one-cylinder positive-displacement piston pump is defined in the respective cylinder 533. Because the housing 531 has the five cylinders 533, the pump 533 provides a five-cylinder piston pump.

The pump 530 produces parallel flows of the working water for the first MCD unit 40 and the second MCD unit 50, due to a group of chambers. One of the cylinders simultaneously generates a flow flowing from the low temperature end 12 toward the middle high temperature end 14 and a flow flowing from the high temperature end 11 toward the middle low temperature end 13. Further, another one of the cylinders simultaneously generates a flow flowing from the high temperature end 11 toward the middle low temperature end 13 and a flow flowing from the low temperature end 12 toward the middle high temperature end 14.

The pump 530 discharges the working water from the high temperature end 11 to the high temperature side circulation passage 15 when the working water flows from the middle low temperature end 13 toward the high temperature end 11. Further, the pump 530 discharges the working water from the low temperature end 12 to the low temperature side circulation passage 16 when the working water flows from the middle high temperature end 14 toward the low temperature end 12.

The pump 530 draws the working water to the high temperature end 11 from the high temperature side circulation passage 15 when the working water flows toward the middle low temperature end 13 from the high temperature end 11. Further, the pump 530 draws the working water to the low temperature end 12 from the low temperature side circulation passage 16 when the working water flows toward the middle high temperature end 14 from the low temperature end 12.

In a case where the plural work chambers 46, 56 are provided to correspond to one capacity chamber, when the external magnetic field is applied to one of the chambers 46, the external magnetic field is not applied to the other chamber 56. As a result, the magneto-caloric element 49 emits heat in the chamber 46, and the hot energy is transported. Simultaneously, the magneto-caloric element 59 absorbs heat in the chamber 56, and the cold energy is transported.

(Other Embodiments)

The present disclosure is not limited to the above embodiments.

The MHP apparatus may be a cooling device that absorbs heat of inside air and emits the heat to outside air, instead of the heating device. In this case, the low-temperature side heat exchanger 4 is located inside and the high-temperature side heat exchanger 3 is located outside.

The MHP apparatus is not limited to have the above construction in which the MCD units 40, 50 oppose each other through the pump 30. Alternatively, the MHP apparatus may be constructed by a half of the pump 30 and one of the MCD units 40, 50. For example, the MHP apparatus may be constructed by the right half of the pump 30 and the MCD unit 40. In this case, the outdoor heat exchanger 4 may be arranged between the pump 30 and the MCD unit 40.

In the magnetic field switcher, the magneto-caloric element may be moved, instead of the rotation of the permanent magnet. An electromagnet may be used instead of the permanent magnet.

The heat transport media is not limited to the working water. A first heat transport media is used for defining the AMR cycle with the electro-caloric element 49, 59, 249, 259. A second heat transport media is used for transporting the cold energy and/or the hot energy obtained by the MHP apparatus to the heat exchanger 3, 4. The first heat transport media and the second heat transport media may be separated from each other. For example, a water circulation circuit and a pump are additionally arranged to transport the hot energy obtained from the high temperature end 11, other than the MHP apparatus.

The heating member may be the battery 6 or the motor 8 instead of the inverter 7 and/or the electric heater 407. Further, the battery 6 and/or the motor 8 may be used as the heating member in addition to the inverter 7 and/or the electric heater 407.

The electric heater 407 is directly fixed to the outer surface of the MCD unit 40 so as to heat the unit 40 in the above description. Alternatively, a heat exchanger may be arranged for exchanging heat between the heat transport media heated by the electric heater 407 and the MCD unit 40.

The multi-cylinder pump is provided by the swash plate pump or the radial piston pump in the above description. Alternatively, other positive-displacement pump may be used as the pump.

One work chamber 46, 56 is arranged to correspond to one cylinder of the pump in the above description. Alternatively, the arrangement may be performed in a manner that plural cylinders correspond to one work chamber, that one cylinder corresponds to plural work chambers, or that plural cylinders correspond to plural work chambers.

The magneto-caloric element 49, 59 has the shape enabling sufficient heat exchange with the working water flowing through the work chamber 46, 56. More specifically, for example, a magneto-caloric element 49 shown in FIG. 8 may be used in the embodiments.

Figure 8:
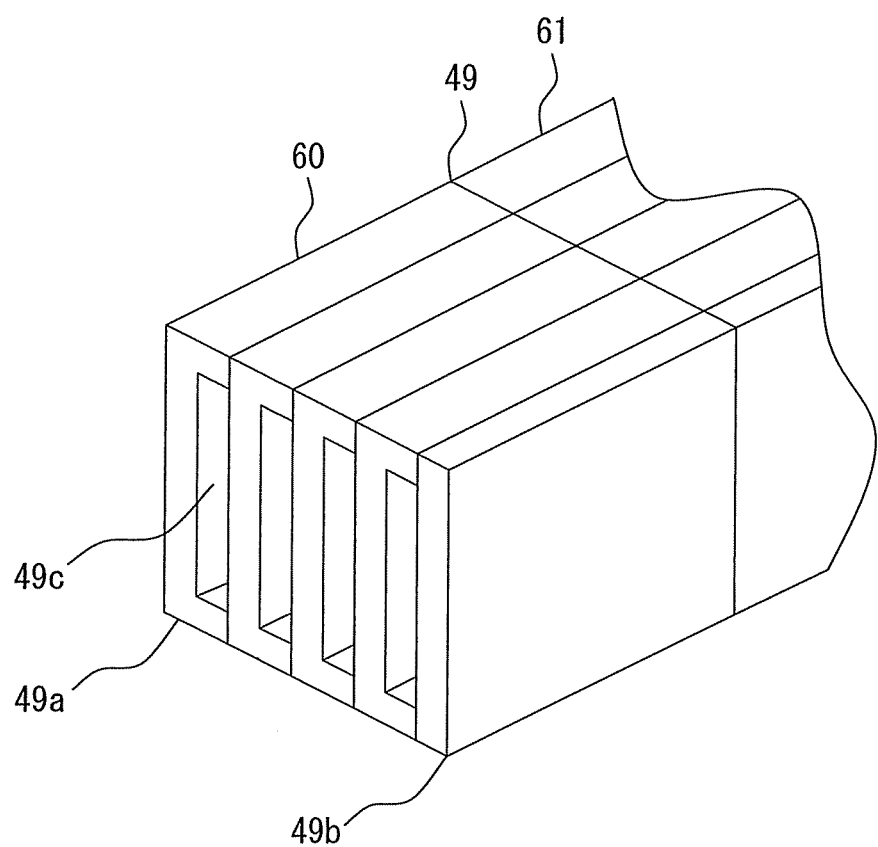
FIG. 8 is a schematic perspective view illustrating a magneto-caloric element that is applicable for the first to fifth embodiments.

As shown in FIG. 8, the magneto-caloric element 49 has a square column shape, and is constructed by layering plural board members 49a, 49b. The board member 49a has a groove 49c that defines a passage for the working water. The board member 49b is located on the end in the layering direction, and has no groove. Alternatively, the magneto-caloric element may be constructed by layering only the same board members having the same shape. The magneto-caloric element 49 has plural passages inside, for the working water. The plural passages facilitate the heat exchange between the element 49 and the working water. The passage is defined between the board members 49a, 49b located adjacent with each other. The magneto-caloric element 59 may have the similar structure as the magneto-caloric element 49.

The MHP apparatus may be used for an air-conditioner in a residence instead of the vehicle.

The main heat source may be water or sand, other than the outside air.

Means and functions of the control device may be provided by only software, only hardware or a combination of the software and the hardware. For example, the control device may be made of an analogue circuit.

Such changes and modifications are to be understood as being within the scope of the present disclosure as defined by the appended claims.

What is claimed is:

1. A magneto-caloric effect type heat pump apparatus comprising:
a first magneto-caloric element which generates heat when a first external magnetic field is applied and which absorbs heat when the first external magnetic field is removed;
a first magnetic field switcher which switches the first external magnetic field between the applying and the removal;
a second magneto-caloric element which generates heat when a second external magnetic field is applied and which absorbs heat when the second external magnetic field is removed;
a second magnetic field switcher which switches the second external magnetic field between the applying and the removal;
a pump pumping heat transport medium from a middle high-temperature end of the first magneto-caloric element toward a high-temperature end of the first magneto-caloric element when the first external magnetic field is applied to the first magneto-caloric element, and pumping the heat transport medium from the high-temperature end toward the middle high-temperature end when the first external magnetic field is removed from the first magneto-caloric element;
the pump pumping the heat transport medium from a low-temperature end of the second magneto-caloric element toward a middle low-temperature end of the second magneto-caloric element when the second external magnetic field is applied to the second magneto-caloric element, and pumping the heat transport medium from the middle low-temperature end toward the low-temperature end when the second external magnetic field is removed from the second magneto-caloric element,
an auxiliary heat source device which supplies heat of a heating element to the first magneto-caloric element; wherein
cold energy which is transported from the high-temperature end toward the middle high-temperature end of the first magneto-caloric element is further transmitted to the middle low-temperature end of the second magneto-caloric element;
the heat of the auxiliary heat source device is transported to the high-temperature end of the first magneto-caloric element;
the auxiliary heat source device includes a heat exchanger that transmits the heat of the heating element to the heat transport medium;
the heat exchanger is disposed outside of a housing that houses the first magneto-caloric element;
the heat exchanger has a ring shape entirely surrounding a circumference of the housing; and
the heat exchanger has an inlet and an exit for the heat transport medium at positions opposing to each other through the housing that houses the first magneto-caloric element.

2. The magneto-caloric effect type heat pump apparatus according to claim 1, wherein
the auxiliary heat source device supplies the heat of the heating element to the first magneto-caloric element through the heat transport medium.

3. The magneto-caloric effect type heat pump apparatus according to claim 1, wherein
the auxiliary heat source device supplies the heat of the heating element to the first magneto-caloric element from an intermediate position located between the middle high-temperature end and the high temperature end.

4. The magneto-caloric effect type heat pump apparatus according to claim 3, wherein
the auxiliary heat source device supplies the heat of the heating element to the first magneto-caloric element from a position adjacent to the high temperature end rather than a middle position between the low temperature end and the high temperature end.

5. The magneto-caloric effect type heat pump apparatus according to claim 2, wherein
the auxiliary heat source device supplies the heat of the heating element to the middle high-temperature end of the first magneto-caloric element.

6. The magneto-caloric effect type heat pump apparatus according to claim 1, wherein
a main heat source is outside air outside of a vehicle, and a thermal load is inside air inside of the vehicle;
heat of the outside air is supplied to the inside air; and
the heating element is an inverter device that supplies electricity to a driving motor for driving the vehicle.

7. The magneto-caloric effect type heat pump apparatus according to claim 1, further comprising:
an outdoor heat exchanger that exchanges heat with a main heat source;
a low-temperature circulation passage passing through the outdoor heat exchanger;
an indoor heat exchanger that exchanges heat with a thermal load; and
a high-temperature circulation passage passing through the indoor heat exchanger, wherein
the pump discharges the heat transport medium to the high-temperature circulation passage from the high-temperature end when the heat transport medium flows from the middle high-temperature end to the high-temperature end,
the pump draws the heat transport medium from the high-temperature circulation passage to the high-temperature end when the heat transport medium flows from the high-temperature end to the middle high-temperature end,
the pump discharges the heat transport medium to the low-temperature circulation passage from the low-temperature end when the heat transport medium flows from the middle low-temperature end to the low-temperature end, and
the pump draws the heat transport medium from the low-temperature circulation passage to the low-temperature end when the heat transport medium flows from the low-temperature end to the middle low-temperature end.

8. The magneto-caloric effect type heat pump apparatus according to claim 7, wherein
the first magneto-caloric element is arranged in a first unit, the first magneto-caloric element having the high-temperature end and the middle high-temperature end opposite from the high-temperature end, and
the second magneto-caloric element is arranged in a second unit, the second magneto-caloric element having the low-temperature end and the middle low-temperature end opposite from the low-temperature end,
the first magnetic field switcher includes
a first permanent magnet arranged in the first unit, the first permanent magnet switching the first external magnetic field between the applying and the removal for the first magneto-caloric element by rotating, and the second magnetic field switcher includes
a second permanent magnet arranged in the second unit, the second permanent magnet switching the second external magnetic field between the applying and the removal for the second magneto-caloric element by rotating, the pump discharges the heat transport medium to the high-temperature circulation passage from the high-temperature end when the heat transport medium flows from the middle high-temperature end to the high-temperature end in the first unit, the pump draws the heat transport medium from the high-temperature circulation passage to the high-temperature end when the heat transport medium flows from the high-temperature end to the middle high-temperature end in the first unit, the pump discharges the heat transport medium to the low-temperature circulation passage from the low-temperature end when the heat transport medium flows from the middle low-temperature end to the low-temperature end in the second unit, and the pump draws the heat transport medium from the low-temperature circulation passage to the low-temperature end when the heat transport medium flows from the low-temperature end to the middle low-temperature end in the second unit.

9. The magneto-caloric effect type heat pump apparatus according to claim 1, wherein the auxiliary heat source device supplies the heat of the heating element to only one of a plurality of element units that has the effective temperature range corresponding to a temperature of the heat of the heating element.

10. The magneto-caloric effect type heat pump apparatus according to claim 1, wherein
a first plurality of element units arranged in series between the high-temperature end and the middle high-temperature end have a step-shaped distribution of the efficient temperature zones corresponding to a temperature distribution defined between the high-temperature end and the middle high-temperature end; and
a second plurality of element units arranged in series between the middle low-temperature end and the low-temperature end have a step-shaped distribution of the efficient temperature zones corresponding to a temperature distribution defined between the middle low-temperature end and the low-temperature end.

11. The magneto-caloric effect type heat pump apparatus according to claim 1, wherein
a first plurality of element units arranged in series between the high-temperature end and the middle high-temperature end have a first element unit having a highest efficient temperature zone located at the high-temperature end and a second element unit having a lowest efficient temperature zone located at the middle high-temperature end; and
a second plurality of element units arranged in series between the middle low-temperature end and the low-temperature end have a first element unit having a highest efficient temperature zone located at the middle low-temperature end and a second element unit having a lowest efficient temperature zone located at the low-temperature end.

12. The magneto-caloric effect type heat pump apparatus according to claim 11, wherein the first plurality of element units arranged in series between the first element unit and the second element unit each have a decreasing efficient temperature zone from the first element unit to the second element unit, the decreasing efficient temperature zones forming a step-shaped distribution between the first and second element units of the first plurality of element units; and
the second plurality of element units arranged in series between the first element unit and the second element unit each have a decreasing efficient temperature zone from the first element unit to the second element unit, the decreasing efficient temperature zones forming a step-shaped distribution between the first and second element units of the second plurality of element units.

13. The magneto-caloric effect type heat pump apparatus according to claim 1, wherein
the magneto-caloric element has a plurality of element units that respectively have efficient temperature ranges different from each other, the plurality of element units having high magneto-caloric effect in the efficient temperature ranges,
the plurality of element units are arranged in series between the high temperature end and the low temperature end in a manner that the efficient temperature ranges are aligned, and
the auxiliary heat source device supplies the heat of the heating element to one of the plurality of element units that has the efficient temperature range corresponding to a temperature of the heat of the heating element.

14. The magneto-caloric effect type heat pump apparatus according to claim 1, wherein the middle high-temperature end of the first magneto-caloric element is thermally bonded to the middle low-temperature of the second magneto-caloric element.

15. The magneto-caloric effect type heat pump apparatus according to claim 1, wherein the heat transport medium includes a first heat transport medium associated with the first magneto-caloric element and a second heat transport medium associated with the second magneto-caloric element, the second heat transport medium being separate from the first heat transport medium.

16. The magneto-caloric effect type heat pump apparatus according to claim 15, wherein the pump includes a driver, the driver pumping both the first heat transport medium and the second heat transport medium.

17. The magneto-caloric effect type heat pump apparatus according to claim 16, wherein the driver is a single cam plate.

18. The magneto-caloric effect type heat pump apparatus according to claim 1, wherein the pump includes a driver, the driver pumping the heat transport medium from the middle high-temperature end toward the high-temperature end and pumping the heat transport medium from the middle-low temperature end toward the low temperature end.

19. The magneto-caloric effect type heat pump apparatus according to claim 18, wherein the driver is a single cam plate.

20. The magneto-caloric effect type heat pump apparatus according to claim 1, wherein the pump starts with the starting of the magneto-caloric effect type heat pump apparatus or in advance of the starting of the magneto-caloric effect type heat pump apparatus.

21. The magneto-caloric effect type heat pump apparatus according to claim 1, further comprising: an auxiliary heat amount controller that controls the amount of heat supplied to the first magneto-caloric element from the auxiliary heat source device.

22. The magneto-caloric effect type heat pump apparatus according to claim 21, wherein the auxiliary heat amount controller controls the auxiliary heat source device to increase a heat amount of the auxiliary heat source device when the magneto-caloric effect type heat pump apparatus is started.

23. The magneto-caloric effect type heat pump apparatus according to claim 1, wherein the heat exchanger is in direct contact with the housing.

24. The magneto-caloric effect type heat pump apparatus according to claim 1, wherein a third heat transport medium disposed within the heat exchanger is separate from the first and second heat transfer mediums such that the third heat transport medium never mixes with either of the first and second heat transfer mediums.

25. The magneto-caloric effect type heat pump apparatus according to claim 24, wherein the third heat transport medium is in direct contact with an outside surface of the housing.

26. The magneto-caloric effect type heat pump apparatus according to claim 24, wherein the third heat transport medium flows in a circumferential direction around an outer surface of the housing.

27. The magneto-caloric effect type heat pump apparatus according to claim 1, wherein the first magneto-caloric element is disposed within a first housing, the second magneto-caloric element is disposed within a second housing and the pump is disposed within a third housing, the first housing being spaced from the second housing, the third housing being disposed between the first and second housings, the first, second and third housings having a common central axis.

28. The magneto-caloric effect type heat pump apparatus according to claim 26, wherein the first magnetic field switcher, the second magnetic field switcher and the pump rotate around a common central axis.

29. The magneto-caloric effect type heat pump apparatus according to claim 1, wherein the first magneto-caloric element is one of a plurality of first magneto-caloric elements arranged in a circumference direction of the housing.

* * * * *